July 17, 1956  H. J. VEGTER ET AL  2,754,968
TREATMENT OF LIQUID MATERIALS IN A HYDROCYCLONE
Filed March 7, 1951  6 Sheets-Sheet 1

INVENTORS
Herman J. Vegter and
Pieter W. Hage
By Cushman, Darby & Cushman
ATTORNEYS

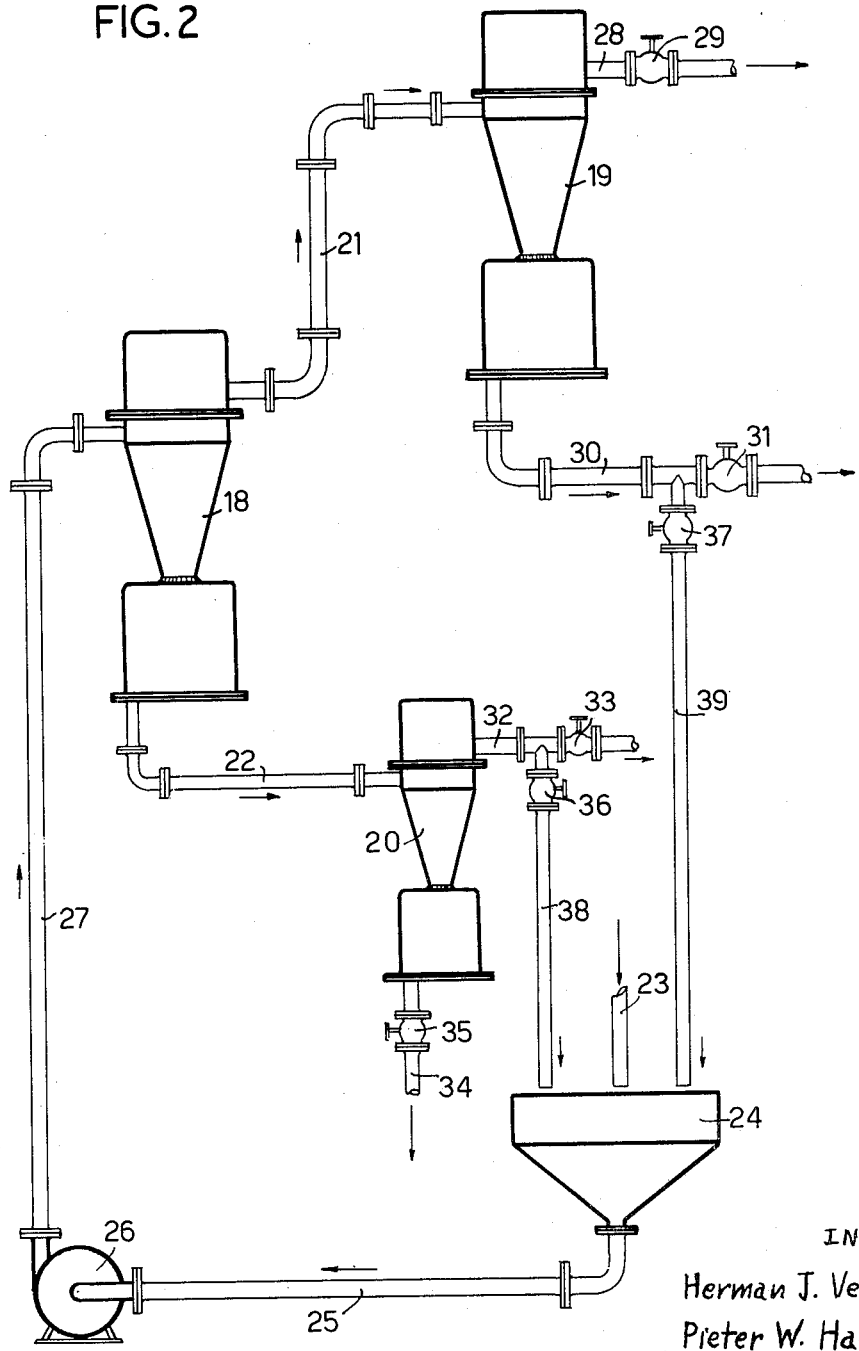

July 17, 1956 H. J. VEGTER ET AL 2,754,968
TREATMENT OF LIQUID MATERIALS IN A HYDROCYCLONE
Filed March 7, 1951 6 Sheets-Sheet 3

INVENTORS
Herman J. Vegter and
Pieter W. Hage
By Cushman, Darby & Cushman
ATTORNEYS July 17, 1956    H. J. VEGTER ET AL    2,754,968
TREATMENT OF LIQUID MATERIALS IN A HYDROCYCLONE
Filed March 7, 1951    6 Sheets-Sheet 4
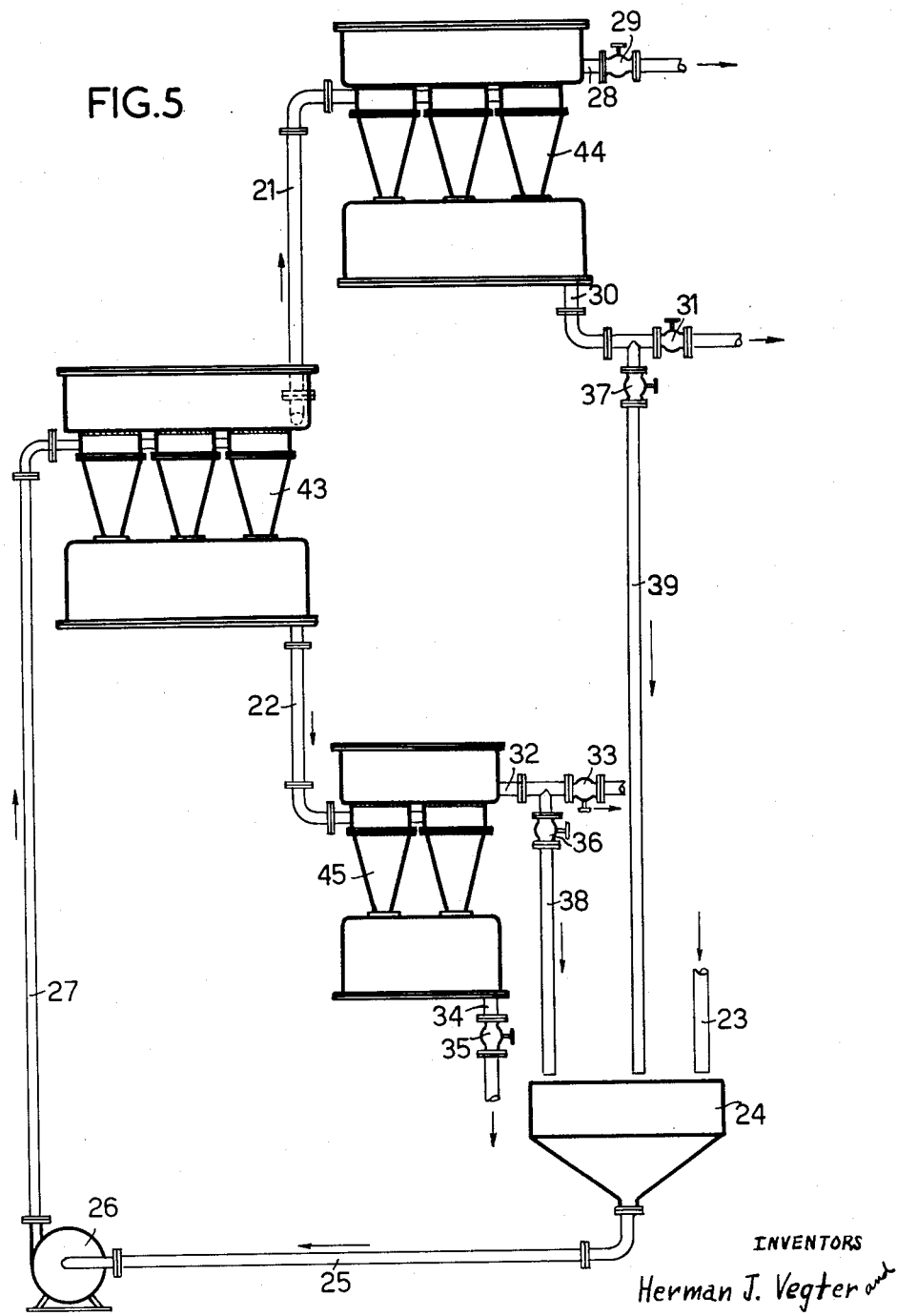

July 17, 1956     H. J. VEGTER ET AL     2,754,968
TREATMENT OF LIQUID MATERIALS IN A HYDROCYCLONE
Filed March 7, 1951     6 Sheets-Sheet 5

INVENTORS
Herman J. Vegter and
Pieter W. Hage
By Cushman, Darby & Cushman
ATTORNEYS

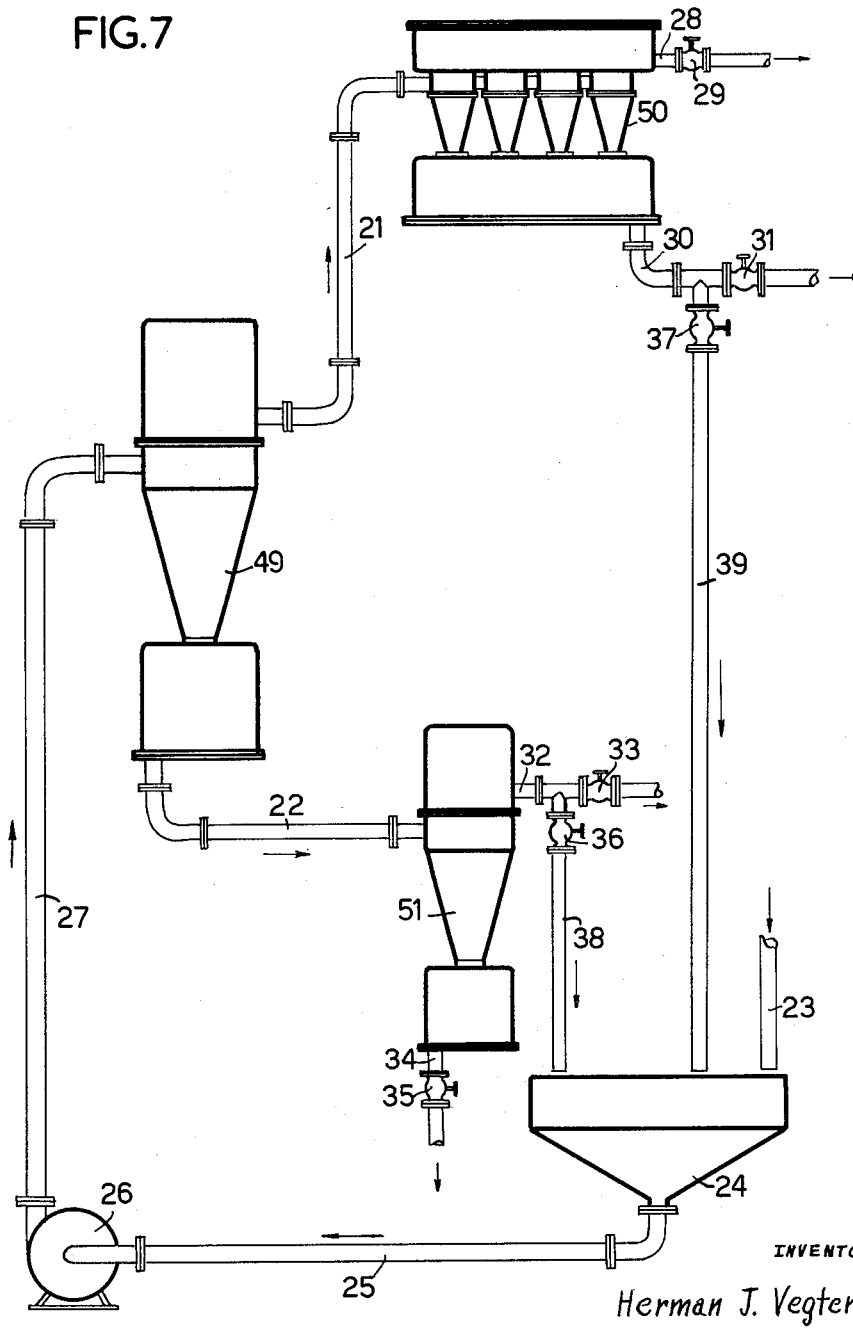

United States Patent Office 2,754,968
Patented July 17, 1956

2,754,968

TREATMENT OF LIQUID MATERIALS IN A HYDROCYCLONE

Herman J. Vegter and Pieter W. Hage, Koog a. d. Zaan, Netherlands, assignors to Stamicarbon N. V., Heerlen, Netherlands Application March 7, 1951, Serial No. 214,328

Claims priority, application Netherlands March 9, 1950

9 Claims. (Cl. 209—211)

The present invention relates to hydrocyclones. In particular this invention relates to an arrangement of hydrocyclones in series and the control thereof.

The operation of a hydrocyclone depends upon its dimensions and upon its operating conditions. Some processes call for large, other for small hydrocyclones. Furthermore the operation of a given hydrocyclone can be changed for instance by restricting the diameter of the vortex finder, by restricting the diameter of the apex aperture, by receiving the vortex finder discharge in a back pressure chamber and changing the rate of withdrawal therefrom, by receiving the apex discharge in a back pressure chamber and changing the rate of withdrawal therefrom and by changing the infeed pressure. Such changes influence the composition of the separated fractions, that is to say their quantity and their quality. One fraction cannot be changed without also affecting the other fraction. Now it is the object of this invention to provide a hydrocyclone apparatus for separating liquid material with which the quality and the quantity of one separated fraction can be changed without substantially affecting the other separated fraction. In general a hydrocyclone can separate a liquid material into one pure and one contaminated fraction. So it is in particular the object of this invention to provide a hydrocyclone apparatus with which two pure fractions can be obtained.

It has been mentioned already that the operation of a hydrocyclone can be affected by changing the feed pressure. Certain limits, however, should be observed. Now with a given hydrocyclone the capacity is roughly directly proportional to the square root of the feed pressure and as the feed pressure must be kept between certain limits the capacity of a given hydrocyclone also remains between certain limits. To increase the capacity over its higher limit would require excessive pressure and with a decrease of the capacity under its lower limit the hydrocyclone would stop operating properly. So it is another object of this invention to provide a hydrocyclone apparatus which can operate at a very low capacity.

The capacity of a ½ inch hydrocyclone is only low and for operating a cornstarch plant with hydrocyclones, many hundreds or even thousands of such hydrocyclones are required. In such plants use is made of multiple hydrocyclones, i. e. a number of identical hydrocyclones provided with a common main feed duct for feeding the separate hydrocyclones, and with common discharge vessels or with common back pressure chambers from which the separated fractions are removed. With multiple hydrocyclones the same problem as mentioned above for hydrocyclones remain to be solved and it is a further object of this invention to do so.

As the energy consumption of hydrocyclones sometimes is excessive, particularly when several hydrocyclone stages in series are required, it is another object of this invention to provide means to reduce significantly the energy consumption of hydrocyclones operating in series.

When several hydrocyclones in series are fed by more than one pump trouble is experienced in tuning the different units up. It is therefore still a further object of the invention to provide a hydrocyclone apparatus, with several hydrocyclones in series but with only one pump.

In summary the above, and possibly other objects, are attained by an apparatus comprising first, second and third hydrocyclones, closed communication means between the vortex finder of the first hydrocyclone and the feed entrance of the second hydrocyclone and closed communication means between the apex aperture of the first hydrocyclone and the feed entrance of the third hydrocyclone.

The invention will be further described with reference to the drawings in which:

Figure 2 is a schematic view of an apparatus according to the invention using hydrocyclones as shown in Figure 1;

Figure 5 is a schematic view of an apparatus according to the invention, using multiple-hydrocyclones of the type as shown in Figure 3.

Figure 6 and Figure 7 are schematic views of apparatus according to the invention, using hydrocyclones as shown in Figure 1 and multiple-hydrocyclones as shown in Figure 3.

Figure 1:
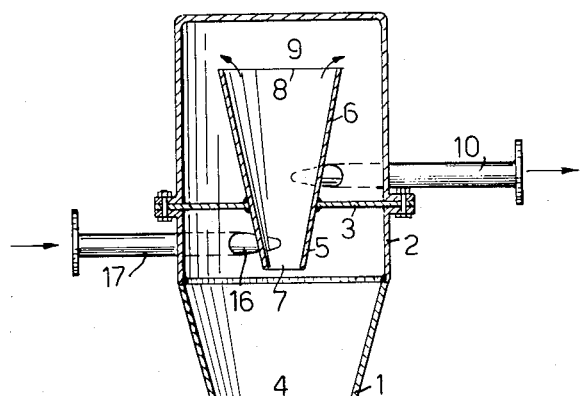
Figure 1 is a longitudinal section of one hydrocyclone as may be used in the present invention.

Figure 1 shows a longitudinal section of a hydrocyclone wherein a smooth and closed surface of revolution, comprising a conical part 1, a cylindrical part 2 and a flat cover plate or base 3, encloses an unobstructed space 4 of diminishing diameter. The base has a central opening through which an unobstructed vortex finder 5 protrudes axially into the wide end of space 4. Outside space 4 the vortex finder is provided with an extension or diffuser 6.

The vortex finder 5 and the diffuser 6 together consist of a truncated cone with a virtual apex angle of 7°, having its smaller end 7 in the wider end of space 4 and having its wider end 8 in a back pressure chamber 9 provided with a base discharge pipe 10. The narrow end or apex of the conical part 1 is provided with an unobstructed apex aperture 11 provided with a diffuser 12 which has a similar shape as diffuser 6. The diffuser 12 has its wider end 13 in a back pressure chamber 14 provided with an apex discharge pipe 15. 16 is an aperture in the wall of the cylindrical part 2 and 17 is a tangential feed entrance leading thereto.

In operation a liquid material is continuously supplied under pressure through the tangential feed entrance 17 and aperture 16 into space 4, whereby the material is caused to rotate during its passage therethrough, the rotational velocity near the central axis of the space being larger than the velocity with which the material is fed into said space. Two concentric vortices are established in the space, an outer one carrying liquid material in the direction of the apex and an inner one carrying liquid material in the opposite direction, the centrifugal forces acting in the space being many hundreds or thousands times as large as gravity. The centrifugal forces separate the liquid material fed into the hydrocyclone, heavier particles being discharged through the apex aperture 11, back pressure chamber 14 and apex discharge pipe 15 and lighter particles being discharged through the vortex finder 5, back pressure chamber 9 and base discharge pipe 10.

With the single hydrocyclone as shown in Figure 1 no use is made of the back pressure in the back pressure chambers 9 and 14. As a matter of fact, with the pipes 10 and 15 terminating in the free atmosphere, no back pressure can build up in the back pressure chamber. Thus the high velocity or kinetic energy of the discharged fraction is wasted.

Figure 2 shows an apparatus, which is useful e. g. for classifying quartz sand, with three hydrocyclones of the type as shown in Figure 1, viz. a first hydrocyclone 18, a second hydrocyclone 19 and a third hydrocyclone 20, the latter one being smaller than hydrocyclones 18 and 19. Pipe 21 connects the chamber 9 associated with hydrocyclone 18 to the hydrocyclone 19. Pipe 22 connects the chamber 14 associated with hydrocyclone 18 to the hydrocyclone 20. Thus there exists a closed communication between the vortex finder of hydrocyclone 18 and the tangential feed entrance of hydrocyclone 19 and another closed communication between the apex aperture of hydrocyclone 18 and the tangential feed entrance of hydrocyclone 20.

In operation liquid material to be treated is fed through feed line 23, container 24, pipe 25, pump 26 and pipe 27 to hydrocyclone 18 in which it is separated, as described in connection with Figure 1. The separated base fraction from hydrocyclone 18 passes through pipe 21 to hydrocyclone 19 and is further separated therein. The base discharge fraction from hydrocyclone 19 is discharged through pipe 28 and valve 29 and constitutes a final product of the separation. The apex discharge fraction from hydrocyclone 19 is discharged either through pipe 30 and valve 31 as a middling of the separation or is returned wholly or partially to container 24 by way of pipe 30, pipe 39 and valve 37.

The separated apex fraction from hydrocyclone 18 passes through pipe 22 to hydrocyclone 20 and is further separated therein. The apex discharge fraction from hydrocyclone 20 is discharged through pipe 34 and valve 35 and constitutes the second final product of the separation. The base discharge fraction from hydrocyclone 20 is discharged either through pipe 32 and valve 33 as a middling of the separation or is returned wholly or partially to container 24 by way of pipe 32, pipe 38 and valve 36.

The operation of hydrocyclone 19 is controlled by means of the control valves 29, 31 and 37 and the operation of hydrocyclone 20 is controlled by means of the control valves 33, 35 and 36.

For the passage of liquid material to and through the hydrocyclones 19 and 20, a certain amount of pressure is required. This means that there is automatically a build up of pressure in the back pressure chambers 9 and 14 of hydrocyclone 18. As a matter of fact the pressure in the back pressure chambers of hydrocyclone 18 is intermediary between the pressure in the pipe 27 and the highest pressure with which fractions are discharged from the hydrocyclones 19 and 20. The pressure in the back pressure chambers of hydrocyclone 18 partially is derived directly from the infeed pressure and partially from the velocity of the fractions discharged from space 4 of hydrocyclone 18, which velocity is converted into static pressure by means of the diffusers 6 and 12 respectively. In this manner it is possible to recover or conserve as much as 60% of the energy required for the operation of hydrocyclone 18. With the single hydrocyclone as shown in Figure 1 no recovery of energy is possible because there is no back pressure in the back pressure chamber, but with the arrangement of Figure 2 back pressure is established and economically used again. It is of course also possible to establish back pressure in the back pressure chambers of the hydrocyclones 19 and 20 and using such back pressure for conveying the fractions to the place where they are wanted.

As mentioned already, the operation of hydrocyclone 19 can be controlled by means of the valves 29, 31 and 37. By further closing valve 29 or by further opening valve 31 or 37 the density and the quantity of the vortex finder discharge fraction of hydrocyclone 19 can be decreased without substantially changing the operation of hydrocyclone 20. By further closing valve 35 or by further opening valve 33 or 36 the density of apex discharge of hydrocyclone 20 can be increased and its quantity decreased, without substantially changing the operation of hydrocyclone 19.

The middlings discharged through pipes 30 and 32 must be subjected to further treatment. This may be effected in a separate installation, but it is also possible to return these fractions to container 24 and hence to hydrocyclone 18. When the middlings are returned to container 24, the quantity of new material fed thereinto through line 23 must be decreased or, on decrease of the amount of new material an increased amount of middlings may be returned to container 24 to insure a constant rate of feed to hydrocyclone 18.

The arrangement as shown in Figure 2 thus enables separation of a liquid material into two pure products notwithstanding changes in the quality or quantity of the feed. The operation of the apparatus is very simple as there is but one pump in the system, so that there is no necessity of tuning up cooperating pumps.

In general the quantity of apex discharge from a hydrocyclone is considerably smaller than the amount of vortex finder discharge, the apex discharge usually being from $\frac{1}{2}$ to $\frac{1}{10}$ the capacity of the base discharge. Under such circumstances the second hydrocyclone (19) receives nearly as much material as the first hydrocyclone (18), but the third hydrocyclone (20) receives significantly less material. The third hydrocyclone therefore should have smaller apertures than the first and second hydrocyclones. In other words, the third hydrocyclone in general will be of a smaller type, having a smaller diameter of its cylindrical part 2. Sometimes the second hydrocyclone also will be smaller than the first one.

It is not possible to give a general rule about the relative dimensions of the hydrocyclones as the ratio mentioned above may vary considerably, but every hydrocyclone should be adapted to treat the amount of material fed thereinto.

The feed pressure of the appartus of Figure 2 is higher than the feed pressure which would be required for a single hydrocyclone but it is less than double the pressure required for a single hydrocyclone, on account of the energy recovery in the back-pressure chambers of the first hydrocyclone.

The arrangement as shown in Figure 2 is also useful to separate a material into more than two fractions. In that case the fractions discharged through pipes 30 and 32, which above have been called "middlings" may also constitute final products. With a two product separation, however, the fractions are contaminated and require further treatment.

Figure 3:
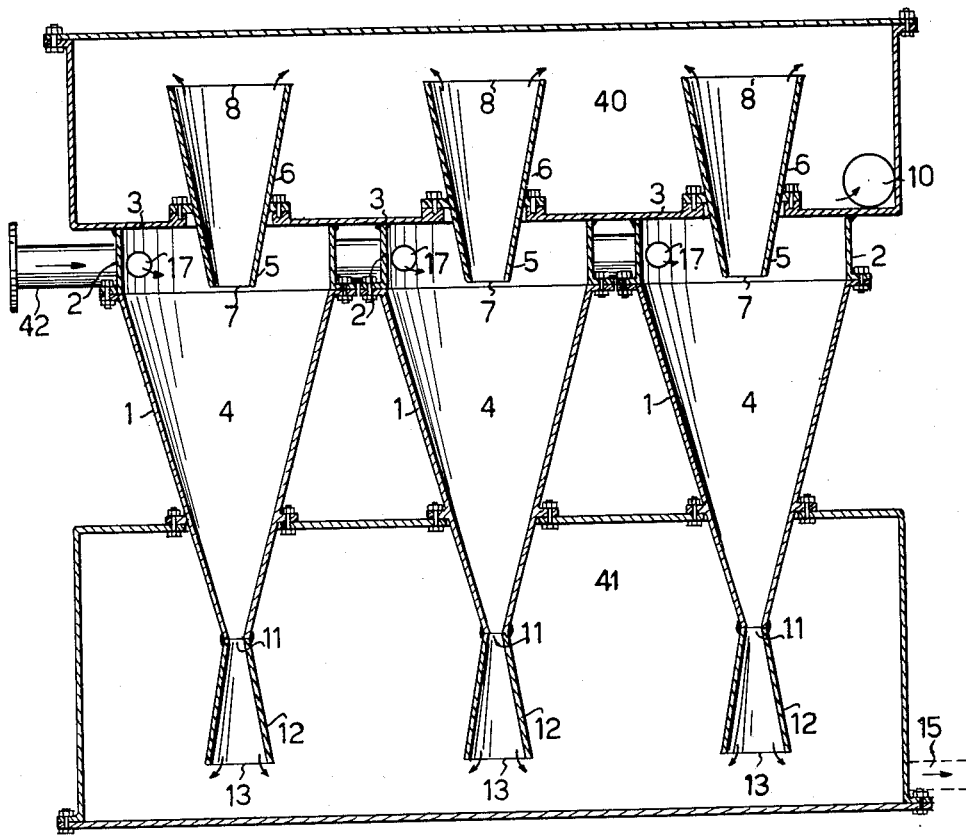
Figure 3 is a longitudinal section of a multiple-hydrocyclone as may be used in the present nivention.

Figure 3 shows a multiple hydrocyclone existing of a number of hydrocyclones, which only differ from the hydrocyclone shown in Figure 1 in that common back-pressure chambers 40 and 41 replace the single back-pressure chambers 9 and 14 of the hydrocyclone of Figure 1. A main feed duct 42 serves for feeding the hydrocyclones.

Figure 4:
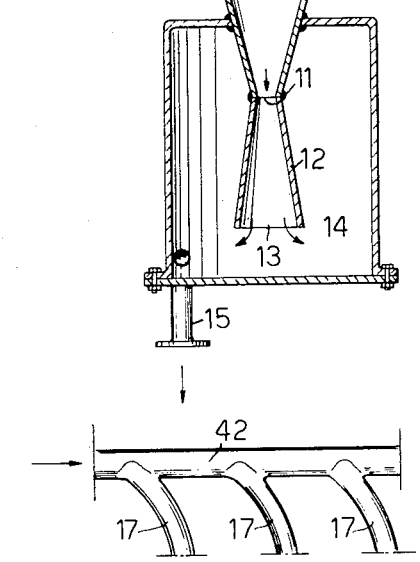
Figure 4 shows a top view of the feed arrangement of the multiple-hydrocyclone of Figure 3.

Figure 4 shows how the tangential feed entrances 17 branch out from main duct 42.

The hydrocyclones of the multiple hydrocyclone operate just like the hydrocyclone of Figure 1. It should be mentioned, however, that all hydrocyclones of a multiple-hydrocyclone must be identical so as to operate in the same manner, because it is impossible to control the operation of the hydrocyclones of a multiple hydrocyclone separately and because small deviations may affect the operation of a hydrocyclone considerably.

Figure 5 is a schematic view of a hydrocyclone apparatus according to the invention using three multiple-hydrocyclones 43, 44 and 45 of the type as shown in Figures 3 and 4. The arrangement of the multiple hydrocyclone is the same as the arrangement of the hydrocyclones in Figure 2 and the apparatus operates in the same manner.

The apparatus of Figure 5 is used when a considerable amount of liquid or liquid material is to be treated and the particular operation requires the use of small, low capacity hydrocyclones such as is the case in the separation of cornstarch and gluten solids. An advantage of this apparatus, as compared with the apparatus of Figure 2 is, that the capacity of the multiple hydrocyclones 43, 44 and 45 can be co-ordinated by properly selecting the number of hydrocyclones incorporated in every hydrocyclone, so that it is not necessary to use hydrocyclones of different shape.

In Figure 5 multiple-hydrocyclones 43 and 44 contain 3 hydrocyclones each and multiple hydrocyclone 45 contains 2 hydrocyclones. Thus the multiple hydrocyclones 44 and 45 together contain more hydrocyclones than multiple hydrocyclone 43, all hydrocyclones having the same dimensions. Contrary to expectations we have found that such arrangement generally works best.

As mentioned above it is not necessary that hydrocyclones of multiple hydrocyclone 45 have a lower capacity than hydrocyclones of multiple hydrocyclone 43. It may be of advantage, however, if hydrocyclones of multiple hydrocyclone 45 have a higher capacity than hydrocyclones of multiple hydrocyclones 43, viz. if the consistency of the apex discharge of hydrocyclones of multiple hydrocyclone 43 is high. In such case treatment may require a multiple hydrocyclone 45 the hydrocyclones of which have a higher capacity than the hydrocyclones of multiple hydrocyclone 43. For the same reason hydrocyclones of multiple hydrocyclone 44 may have a lower capacity than hydrocyclones of multiple hydrocyclone 43.

In this respect it should be stated that the capacity of a hydrocyclone depends upon the diameter of its apertures, a hydrocyclone with larger apertures having a higher capacity. In general an increase of the diameter of the apertures of a hydrocyclone also necessitates to increase the diameter of the cylindrical section, or in other words, to increase the hydrocyclone itself.

The capacity of a hydrocyclone also may be increased somewhat by decreasing its cone angle.

Figure 6:
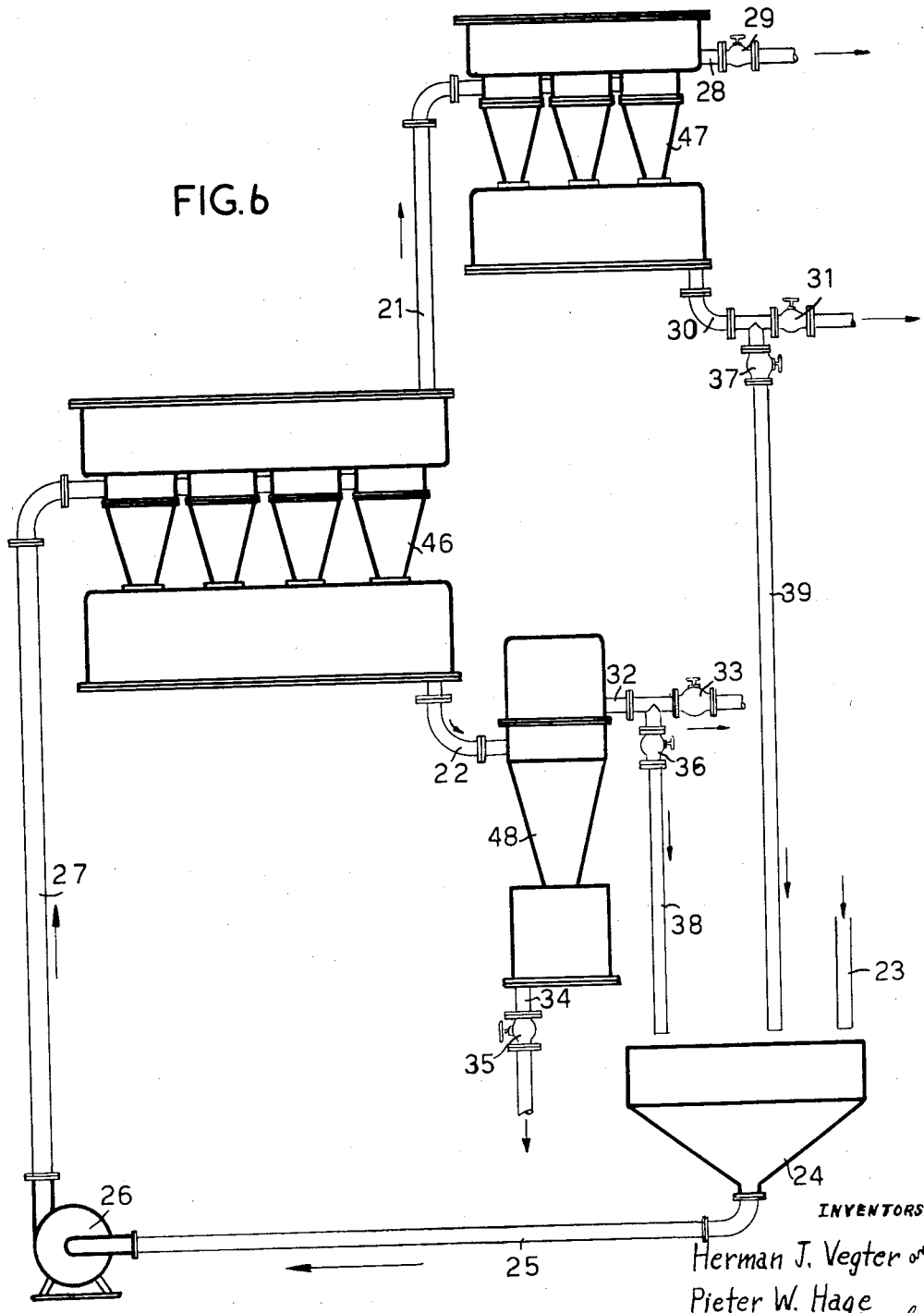

Figures 6 and 7 show arrangements similar to those of Figures 2 and 5. In Figure 6 the base fraction of a first multiple hydrocyclone 46 is fed into second multiple hydrocyclone 47, whereas the apex fraction of multiple hydrocyclone 46 is fed into a single hydrocyclone 48.

In Figure 7 the vortex finder discharge of a first hydrocyclone 49 is fed into multiple hydrocyclone 50, whereas the apex discharge of hydrocyclone 49 is fed into hydrocyclone 51.

Obviously several other combinations can be used within the scope of the invention. It depends upon the process to be effected which combination is to be selected and it is impossible to give a general rule.

It has been mentioned already that the dimensions of a single hydrocyclone depend upon the material to be treated. After determining the dimensions of the single hydrocyclone to be used in the first stage, the question arises how many of such hydrocyclones are required. If only one hydrocyclone is required, it is necessary to determine the quantity of vortex finder discharge and the amount of apex discharge derived from such first stage hydrocyclone. Then the dimensions of the second and third hydrocyclones can be determined in dependency upon these quantities.

If a multiple hydrocyclone is required in the first stage the hydrocyclones in the next stages can be selected so as to give the best results when operating on the fractions discharged from the multiple hydrocyclone of the first stage. Then the required number of these hydrocyclones can be easily calculated.

*Example 1*

For classifying quartz sand into two fractions one of which is to contain the particles larger than 60 microns and the other of which is to contain the particles smaller than 60 microns an arrangement as shown in Figure 2 is used. The hydrocyclones have the following dimensions:

| | Hydrocyclone 18 | Hydrocyclone 19 | Hydrocyclone 20 |
|---|---|---|---|
| Diameter of cylindrical part 2___mm__ | 350 | 350 | 200 |
| Length of cylindrical part 2_____mm__ | 235 | 235 | 132 |
| Cone angle of conical part 1___degrees__ | 20 | 20 | 60 |
| Diameter of feed aperture 16_____mm__ | 70 | 70 | 40 |
| Diameter 7 of vortex finder 5____mm__ | 150 | 150 | 85 |
| Length of vortex finder 5, inside cylindrical part 2_____mm__ | 150 | 150 | 75 |
| Length of diffuser 6_____mm__ | 150 | 150 | 75 |
| Virtual cone angle of diffuser 6_degrees__ | 7 | 7 | 7 |
| Diameter of apex aperture 11_____mm__ | 100 | 20 | 50 |
| Length of diffuser 12_____mm__ | 150 | 150 | 75 |
| Virtual cone angle of diffuser 12_degrees__ | 7 | 7 | 7 |

The feed pressure in pipe 27 amounts to 0.7 kg. per square centimeter gauge pressure, the back pressure in the back pressure chambers of hydrocyclone 19 amounts to 0.35 kg. per square centimeter gauge pressure and the pressure in the back-pressure chambers of hydrocyclone 20 is atmospheric.

The valves 31 and 33 are closed, so that the middlings are recirculated. Under these conditions the apparatus has a capacity of 33 cubic meters per hour of water containing 194 kg. of sand per cubic meter.

The base discharge of hydrocyclone 19 amounts to 29 cubic meters containing per cubic meter 31.2 kg. fines and the apex discharge of hydrocyclone 20 amounts to 4 cubic meters containing 1362 kg. of sand per cubic meter. 17 cubic meters are recirculated per hour. The size distribution of the separated fractions is as follows:

| size | fine fraction in percent of fraction | coarse fraction in percent of fraction |
|---|---|---|
| +500 micron_____ | 0 | 0.7 |
| +350-500 micron_____ | 0 | 9.4 |
| +210-350 micron_____ | 0 | 53.1 |
| +105-210 micron_____ | 0 | 31.7 |
| +75-105 micron_____ | 0 | 0.9 |
| +60-75 micron_____ | 0 | 0.4 |
| +45-60 micron_____ | 4.0 | 1.7 |
| +20-45 micron_____ | 28.4 | 1.4 |
| +10-20 micron_____ | 20.8 | 0.2 |
| −10 micron_____ | 46.8 | 0.5 |

When handling other materials the operating conditions and the dimensions of the hydrocyclones may have to be changed, as follows from

*Example 2*

For treating the tailings of cornstarch-tables into a gluten poor starch fraction and into a starch poor gluten-solids fraction, use is made of an arrangement as shown in Figure 5. The hydrocyclones of the multiple hydrocyclones are identical, viz.:

Diameter of cylindrical part 2_____mm__ 10
Length of cylindrical part 2_____mm__ 6
Cone angle of conical part 1_____radians__ 0.1
Diameter of feed aperture 16_____mm__ 2.5
Diameter 7 of vortex finder 5_____mm__ 2.5
Length of vortex finder 5 inside cylindrical part 2
    mm__ 4.5
Length of diffuser 6_____mm__ 37
Virtual cone angle of diffuser 6_____radians__ 0.1
Diameter of apex aperture 11_____mm__ 2.7
Length of diffuser 12_____mm__ 35
Virtual apex angle of diffuser 12_____radians__ 0.1

Multiple hydrocyclone 43 contains 400 hydrocyclones, multiple hydrocyclone 44 contains 300 hydrocyclones and multiple-hydrocyclone 45 contains 150 hydrocyclones.

The apparatus is operated under the following conditions:

|  | Kg. per square cm. gauge pressure |
|---|---|
| Feed pressure in pipe 27 | 8 |
| Back pressure in pipe 28 (before valve 29) | 1.25 |
| Back pressure in pipe 30 (before valve 37) | 1.8 |
| Back pressure in pipe 32 (before valve 36) | 0.5 |
| Back pressure in pipe 34 (before valve 35) | 0.95 |

Valves 31 and 33 are closed, so that the middlings are completely recirculated. Under these conditions 88,000 liters of table tailings containing per liter 47.5 grams of solids with 26% of gluten and 59% of starch, are treated every hour.

Pipe 28 discharges 63,000 liters per hour containing per liter 18 grams of solids with 70% of gluten and 15% of starch.

Pipe 34 discharges 25,000 liters per hour containing per liter 122 grams of solids with 10% of gluten and 75% starch. Apart from the 88,000 liters per hour of table tailings multiple-hydrocyclone 49 receives 15,000 liters per hour of middlings from pipe 39, containing 49 grams of solids per liter with 26% of gluten and 56% of starch and 20,000 liters per hour of middlings from pipe 38, containing 52 grams of solids per liter with 24% of gluten and 58% of starch. Thus the middlings approximately have the same composition as the feed.

The back pressure in pipe 21 amounts to 4.7 kg. per square centimeter gauge pressure, the back pressure in pipe 22 amounts to 5.0 kg. per square centimeter gauge pressure.

These results can be improved somewhat by replacing the 150 hydrocyclones of multiple hydrocyclone 45 by approximately 75 hydrocyclones being 1.5 times as large as the hydrocyclones described above and having a cone angle of the conical part 1 of 0.3 radian. The terminology employed in the specification is for the purpose of description and not of limitation, the scope of the invention being indicated in the claims.

We claim:

1. Apparatus for separating liquid material comprising first, second, and third hydrocyclones each including an unobstructed space of diminishing diameter confined by a smooth and closed surface of revolution, a tangential feed entrance located near the base of said space, an unobstructed vortex finder protruding axially through a central opening in said base into the wide end of said space, and an unobstructed aperture at the apex of said space, diffuser means associated with the apex of said first hydrocyclone and adapted to convert velocity of liquid discharged therethrough into pressure, first closed communication means in receiving relation to the vortex finder of said first hydrocyclone and in feeding relation to the feed entrance of said second hydrocyclone, second closed communication means in receiving relation to the apex aperture of said first hydrocyclone and in feeding relation to the feed entrance of said third hydrocyclone, and a single pump communicating with the feed entrance of said first hydrocyclone for continuously forcing liquid material through said first hydrocyclone and the vortex finder fraction discharged by said first hydrocyclone through said first closed communication means and said second hydrocyclone, and the apex discharge fraction discharged by said first hydrocyclone through said second closed communication means and said third hydrocyclone.

2. Apparatus for separating liquid material comprising first, second, and third hydrocyclones each including an unobstructed space of diminishing diameter confined by a smooth and closed surface of revolution, a tangential feed entrance located near the base of said space, an unobstructed vortex finder protruding axially through a central opening in said base into the wide end of said space, and an unobstructed aperture at the apex of said space, diffuser means associated with the vortex finder and with the apex of said first hydrocyclone, each diffuser means being adapted to convert velocity of liquid discharged therethrough into pressure, first closed communication means in receiving relation to the vortex finder of said first hydrocyclone and in feeding relation to the feed entrance of said second hydrocyclone, second closed communication means in receiving relation to the apex aperture of said first hydrocyclone and in feeding relation to the feed entrance of said third hydrocyclone, and a single pump communicating with the feed entrance of said first hydrocyclone for continuously forcing liquid material through said first hydrocyclone and the vortex finder fraction discharged by said first hydrocyclone through said first closed communication means and said second hydrocyclone, and the apex discharge fraction discharged by said first hydrocyclone through said second closed communication means and said third hydrocyclone.

3. Apparatus for separating liquid material comprising first, second and third multiple hydrocyclones, each of said multiple hydrocyclones including a plurality of identical hydrocyclones and a common feed duct therefor, a first closed back pressure chamber in receiving relation to the vortex finders of the hydrocyclones of said first multiple hydrocyclone, diffuser means associated with the vortex finders of the hydrocyclones of said first multiple hydrocyclone and adapted to convert velocity of liquid discharged therethrough into pressure, first closed communication means between said first back pressure chamber and the common feed duct of said second multiple hydrocyclone, a second closed back pressure chamber in receiving relation to the apex apertures of the hydrocyclones of said first multiple hydrocyclone, second closed communication means between said second back pressure chamber and the common feed duct of said third multiple hydrocyclone, and a single pump communicating with the common feed duct of said first multiple hydrocyclone for continuously forcing liquid material through said first multiple hydrocyclone and the vortex finder fraction of said first multiple hydrocyclone through said first back pressure chamber, said first closed communication means and said second multiple hydrocyclone, and the apex discharge fraction of said first multiple hydrocyclone through said second back pressure chamber, said second closed communication means and said third multiple hydrocyclone.

4. Apparatus for separating liquid material comprising first, second and third multiple hydrocyclones, each of said multiple hydrocyclones including a plurality of identical hydrocyclones and a common feed duct therefor, a first closed back pressure chamber in receiving relation to the vortex finders of the hydrocyclones of said first multiple hydrocyclone, first closed communication means between said first back pressure chamber and the common feed duct of said second multiple hydrocyclone, a second closed back pressure chamber in receiving relation to the apex apertures of the hydrocyclones of said first multiple hydrocyclone, diffuser means associated with the apexes of the hydrocyclones of said first multiple hydrocyclone and adapted to convert velocity of liquid discharged therethrough into pressure, second closed communication means between said second back pressure chamber and the common feed duct of said third multiple hydrocyclone, and a single pump communicating with the common feed duct of said first multiple hydrocyclone for continuously forcing liquid material through said first multiple hydrocyclone and the vortex finder fraction of said first multiple hydrocyclone through said first back pressure chamber, said first closed communication means and said second multiple hydrocyclone, and the apex discharge fraction of said first multiple hydrocyclone through said second back pressure chamber, said second closed communication means and said third multiple hydrocyclone.

5. Apparatus for separating liquid material comprising first, second and third multiple hydrocyclones, each of said multiple hydrocyclones including a plurality of identical hydrocyclones and a common feed duct therefor, a first closed back pressure chamber in receiving relation to the vortex finders of the hydrocyclones of said first multiple hydrocyclone, diffuser means associated with the vortex finders of the hydrocyclones of said first multiple hydrocyclone and adapted to convert velocity of liquid discharged therethrough into pressure, first closed communication means between said first back pressure chamber and the common feed duct of said second multiple hydrocyclone, a second closed back pressure chamber in receiving relation to the apex apertures of the hydrocyclones of said first multiple hydrocyclone, diffuser means associated with the apexes of the hydrocyclones of said first multiple hydrocyclone and adapted to convert velocity of liquid discharged therethrough into pressure, second closed communication means between said second back pressure chamber and the common feed duct of said third multiple hydrocyclone, and a single pump communicating with the common feed duct of said first multiple hydrocyclone for continuously forcing liquid material through said first multiple hydrocyclone and the vortex finder fraction of said first multiple hydrocyclone through said first back pressure chamber, said first closed communication means and said second multiple hydrocyclone, and the apex discharge fraction of said first multiple hydrocyclone through said second back pressure chamber, said second closed communication means and said third multiple hydrocyclone.

6. Apparatus for separating liquid material comprising first and second multiple hydrocyclones, each of said multiple hydrocyclones including a plurality of identical hydrocyclones and a common feed duct therefor, a third hydrocyclone, a first closed back pressure chamber in receiving relation to the vortex finders of the hydrocyclones of said first multiple hydrocyclone, diffuser means associated with the vortex finders of the hydrocyclones of said first multiple hydrocyclone and adapted to convert velocity of liquid discharged therethrough into pressure, first closed communication means between said first back pressure chamber and the common feed duct of said second multiple hydrocyclone, a second closed back pressure chamber in receiving relation to the apex apertures of the hydrocyclones of said first multiple hydrocyclone, diffuser means associated with the apexes of the hydrocyclones of said first multiple hydrocyclone and adapted to convert velocity of liquid discharged therethrough into pressure, second closed communication means between said second back pressure chamber and the feed duct of said third hydrocyclone, and a single pump communicating with the common feed duct of said first multiple hydrocyclone for continuously forcing liquid material through said first multiple hydrocyclone and the vortex finder fraction of said first multiple hydrocyclone through said first back pressure chamber, said first closed communication means and said second multiple hydrocyclone, and the apex discharge fraction of said first multiple hydrocyclone through said second back pressure chamber, said second closed communication means and said third hydrocyclone.

7. Apparatus for separating liquid material comprising first and third hydrocyclones, a second multiple hydrocyclone including a plurality of identical hydrocyclones and a common feed duct therefor, diffuser means associated with the vortex finder of said first hydrocyclone and adapted to convert velocity of liquid discharged therethrough into pressure, first closed communication means between the vortex finder of said first hydrocyclone and the common feed duct of said second multiple hydrocyclone, diffuser means associated with the apex of said first hydrocyclone and adapted to convert velocity of liquid discharged therethrough into pressure, second closed communication means between the apex aperture of said first hydrocyclone and the feed entrance of said third hydrocyclone, and a single pump communicating with the feed entrance of said first hydrocyclone for continuously forcing liquid material through said first hydrocyclone and the vortex finder fraction of said first hydrocyclone through said first closed communication means and said second multiple hydrocyclone, and the apex discharge fraction of said first hydrocyclone through said second closed communication means and said third hydrocyclone.

8. Apparatus for separating liquid material comprising first and second multiple hydrocyclones, each of said multiple hydrocyclones including a plurality of identical hydrocyclones and a common feed duct therefor, diffuser means associated with the vortex finder of each hydrocyclone of said first multiple hydrocyclone and adapted to convert velocity of liquid discharged therethrough into pressure, a closed back pressure chamber in receiving relation to the vortex finders of the hydrocyclones of said first multiple hydrocyclone, closed communication means between said back pressure chamber and the common feed duct of said second multiple hydrocyclone, and a single pump communicating with the common feed duct of said first multiple hydrocyclone for continuously forcing liquid material through said first multiple hydrocyclone and the vortex finder fraction of said first multiple hydrocyclone through said back pressure chamber, said closed communication means and said second multiple hydrocyclone.

9. Apparatus for separating liquid material comprising a first hydrocyclone and a second multiple hydrocyclone, said multiple hydrocyclone including a plurality of identical hydrocyclones and a common feed duct therefor, said first hydrocyclone including diffuser means associated with the vortex finder thereof and adapted to convert velocity of liquid discharged therethrough into pressure, a closed back pressure chamber in receiving relation to the vortex finder of said first hydrocyclone, closed communication means between said back pressure chamber and the common feed duct of said second multiple hydrocyclone, and a single pump communicating with the feed duct of said first hydrocyclone for continuously forcing liquid material through said first hydrocyclone and the vortex finder fraction of said first hydrocyclone through said back pressure chamber, said closed communication means and said second multiple hydrocyclone.

References Cited in the file of this patent

UNITED STATES PATENTS

| | | |
|---|---|---|
| 2,377,524 | Samson et al. | June 5, 1945 |
| 2,504,944 | Atkinson et al. | Apr. 18, 1950 |
| 2,550,341 | Fontein | Apr. 24, 1951 |
| 2,671,560 | Fontein et al. | Mar. 9, 1954 |

FOREIGN PATENTS

| | | |
|---|---|---|
| 238,137 | Switzerland | Oct. 16, 1945 |
| 607,788 | Great Britain | Sept. 6, 1948 |